United States Patent [19]

Shiozaki et al.

[11] Patent Number: 4,708,111

[45] Date of Patent: Nov. 24, 1987

[54] ELECTRONICALLY CONTROLLED FUEL INJECTION BASED ON MINIMUM TIME CONTROL FOR DIESEL ENGINES

[75] Inventors: Makoto Shiozaki, Kariya; Ichiro Akahori, Anjo, both of Japan

[73] Assignee: Nippondenso Co., Ltd., Kariya, Japan

[21] Appl. No.: 777,683

[22] Filed: Sep. 19, 1985

[30] Foreign Application Priority Data

Sep. 19, 1984 [JP] Japan .................... 59-197588
Sep. 20, 1984 [JP] Japan .................... 59-198249

[51] Int. Cl.⁴ .................................. F02M 39/00
[52] U.S. Cl. ............................ 123/357; 123/494
[58] Field of Search ............ 123/357, 358, 359, 494; 73/119 A

[56] References Cited

U.S. PATENT DOCUMENTS

| | | | |
|---|---|---|---|
| 4,423,713 | 1/1984 | Sami | 123/357 |
| 4,425,889 | 1/1984 | Hachitani | 123/357 |
| 4,428,341 | 1/1984 | Hassler | 123/359 |
| 4,438,496 | 3/1984 | Ohie | 123/357 |
| 4,502,438 | 3/1985 | Yasuhara | 123/357 |
| 4,509,480 | 4/1985 | Kull | 123/359 |
| 4,515,125 | 5/1985 | Buck | 123/359 |
| 4,520,779 | 6/1985 | Kubach | 123/357 |
| 4,523,562 | 6/1985 | Schnapper | 123/357 |
| 4,538,571 | 9/1985 | Buck | 123/357 |

FOREIGN PATENT DOCUMENTS

| | | | |
|---|---|---|---|
| 1590459 | 3/1981 | Fed. Rep. of Germany | 123/357 |
| 2369422 | 5/1978 | France | 123/357 |
| 0133440 | 8/1983 | Japan | 123/381 |
| 59-25047 | 2/1984 | Japan . | |

OTHER PUBLICATIONS

"Automatic Control Handbook" Edited by Instrumentation and Automatic Control Academy pp. 287-291.
"Development of a Fully Capable Electronic Control System for Diesel Engines" by Makoto Shiozaki et al., SAE Technical Paper Series 850172, Feb. 25-Mar. 1, 1985.
Patents Abstracts of Japan, vol. 8, No. 108(M-297) [1545], 19th May 1984; & JP-A-59 18254 (Nissan Jidosha K.K.) 30-01-1984.
IEEE Transactions on Automatic Control, vol. AC-25, No. 5, Oct. 1980, pp. 901-911, IEEE, New York, US; J. F. Cassidy et al.: "On the Design of Electronic Automotive Engine Controls Using Linear Quadratic Control Theory".
Proceedings Iecon 1984, International Conference on Industrial Electronics, Control and Instrumentation, Tokyo, JP, 22nd-26th Oct. 1984, vol. 1, pp. 78-82; M. Ohba et al.: "Microprocessor-Controlled Servo System Using Modern Control Theory Distributer Type Fuel Injection Pump".

Primary Examiner—Carl Stuart Miller
Attorney, Agent, or Firm—Cushman, Darby & Cushman

[57] ABSTRACT

Disclosed is an electronically controlled fuel injection system for controlling a fuel quantity to be injected each cylinder of a diesel engine by a fuel injection pump (5), wherein a positioning servo system is employed which is arranged to calculate a control input value of an actuator (82) in accordance with a signal from an actual position sensor (84) and a signal from a fuel quantity control unit (2) so that the actual position of a fuel adjustment member (83) is coincident with a desired position thereof indicated by the signal from the control unit (2). The servo system comprises a minimum time control unit (7) and a speed estimation unit (9). The minimum time control unit (7) derives the control input value from a map established on the basis of the nonlinear dynamic model of the actuator (82) as a function of a deviation between the actual and desired positions, a current passing through the actuator (82) and a speed of the fuel adjustment member estimated by the speed estimation unit (9).

5 Claims, 13 Drawing Figures

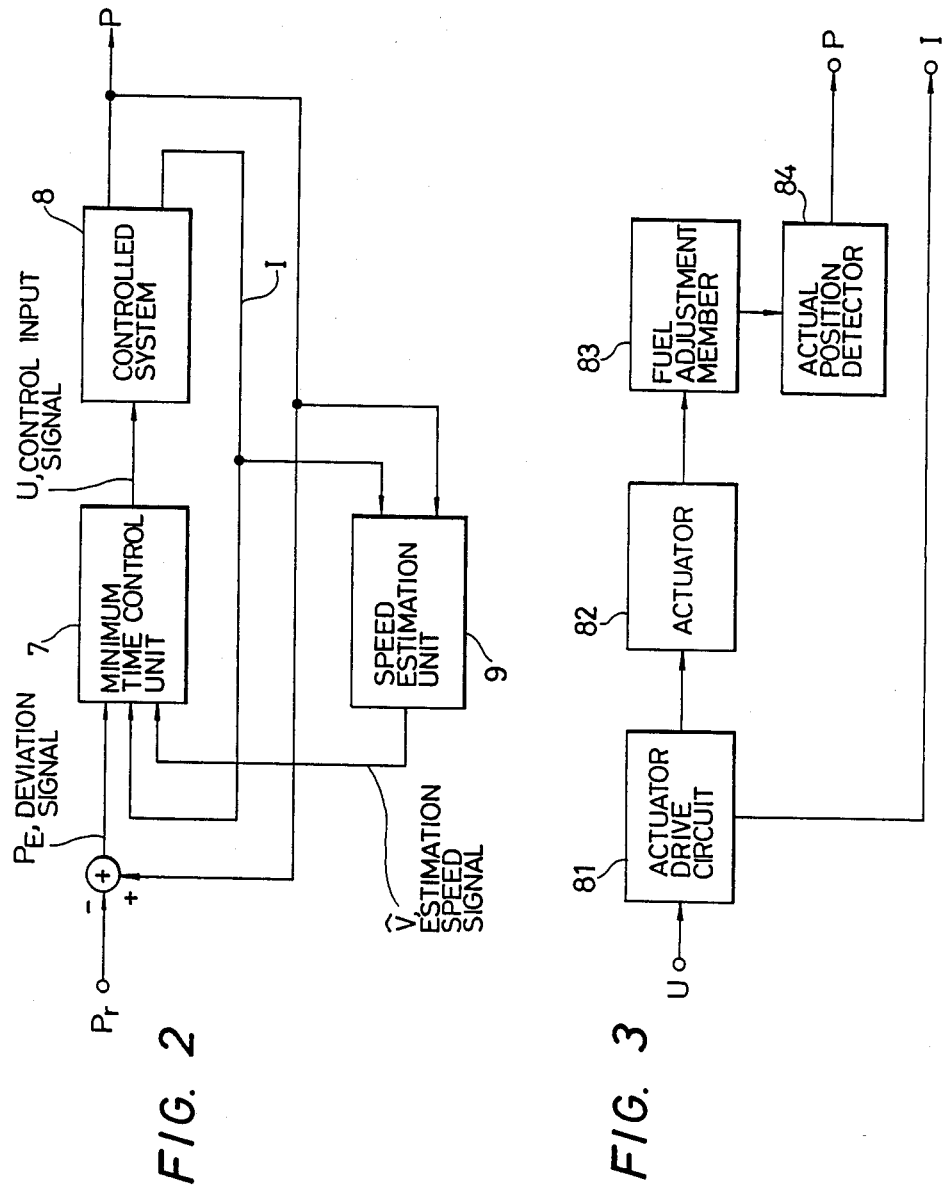

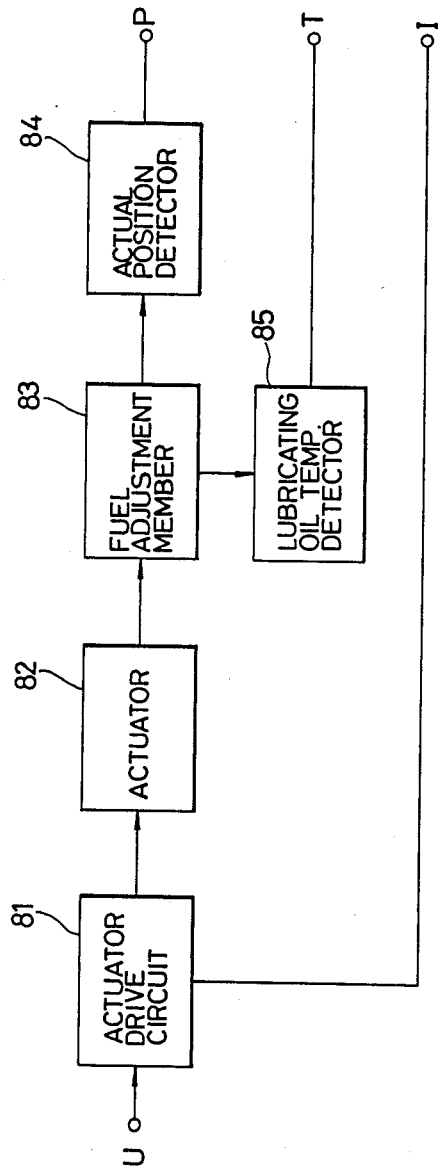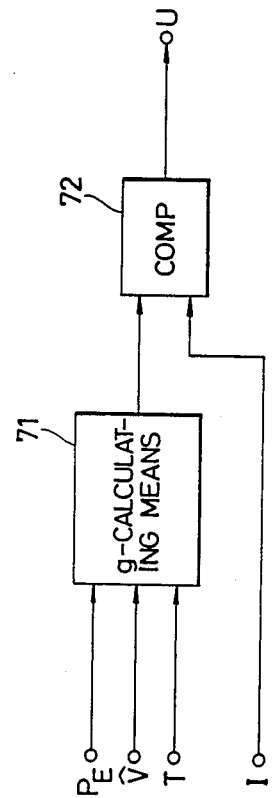

ELECTRONICALLY CONTROLLED FUEL INJECTION BASED ON MINIMUM TIME CONTROL FOR DIESEL ENGINES

BACKGROUND OF THE INVENTION

The present invention relates to an electronically controlled fuel injection system for controlling a fuel quantity to be injected into each cylinder of a diesel engine by a fuel injection pump, and in particular to such a system for controlling an actuator of the fuel injection pump by means of a servo mechanism so that a fuel quantity adjusting member operatively responsive to the energization of the actuator is controlled for a high precision positioning thereof.

In a prior art electronically controlled fuel injection system, a PID (Proportional Integral Differential) control process is employed in a positioning servo system for the purpose of controlling so that an actual position of the fuel injection adjustment member coincides with a desired position thereof corresponding to an optimum injection fuel quantity, derived as a function of engine operating conditions determined on the basis of engine operating parameters. One example of such a PID control servo system is disclosed in Japanese Laid-Open Patent Application No. 59-25047.

The factors generally required to position servo systems, include accuracy, response time, stabilization and overshoot amount. In order to increase the capability and performance thereof, it is important not only that each of the factors is enhanced or optimized, but also that these factors be simultaneously satisfied without making any of them worse.

However, according to the PID control, it is impossble to simultaneously satisfy the above-described factors. For example, an increase in proportional gain for a quick response results in an excess of overshoot and also in a reduction of stability. In addition, it is difficult to obtain an appropriate servo characteristic because of the non-linear characteristic of the controlled system, i.e., actuator.

SUMMARY OF THE INVENTION

It is accordingly an object of the present invention to provide a new and improved electronic fuel injection control system which overcomes the above-described disadvantages inherent in the prior art control systems.

More particularly, in accordance with the present invention, an electronically controlled fuel injection system is provided which avoids all of the above-noted problems by employing, as a replacement of the PID control system based on a classic control theory, the minimum time control system on the basis of the nonlinear optimum control theory of the modern control theory for the positioning servo mechanism.

The technique of the present invention involves employing a minimum time control system to determine a control amount value of an actuator so that an actual position of a fuel adjusting member coincides with a desired position, the control amount value being obtained in accordance with an nonlinear dynamic model of the actuator. A further feature of this invention involves performing the minimum time control operation in view of the variations of lubricating oil temperature of the fuel injection pump.

Thus, the present invention not only makes possible a further quick position adjustment of the fuel adjustment member, but also offers the very significant advantage to enabling servo operations with high accuracy, high reliability and high speed, that it is difficult to obtain in accordance with PID control or linear control theory.

In accordance with the present invention, there is provided a system for controlling a fuel quantity to be injected into each cylinder of a diesel engine by a fuel injection pump, comprising: an actuator attached to said fuel injection pump; a fuel adjustment member operatively coupled to said fuel injection pump and responsive to an energization of said actuator for adjusting a quantity of fuel to be injected into said each cylinder of said diesel engine; sensor means for sensing an actual position of said fuel adjustment member and generating a signal indicative of said actual position; sensor means for sensing engine operating parameters; means for detecting an operating condition of said engine in accordance with the sensed engine operating parameters; fuel quantity control means for calculating a fuel quantity necessary for the detected engine operating condition and generate a signal indicative of a desired position of said fuel adjustment member corresponding to the calculated fuel quantity; servo control means responsive to said signal from said actual position sensor means and said signal from said fuel quantity control means for computing a control input value and producing an output signal so that the actual position of said fuel adjustment member sensed by said actual position sensor means is coincident with the desired position thereof indicated by said signal from said fuel quantity control means, said servo control means including minimum time control means deriving said control input value on the basis of a nonlinear dynamic model of said actuator.

Furthermore, in accordance with this invention, there is provided a system for controlling a fuel quantity to be injected into each cylinder of a diesel engine by a fuel injection pump, comprising: an actuator attached to said fuel injection pump; a fuel adjustment member operatively coupled to said fuel injection pump and responsive to an energization of said actuator for adjusting a quantity of fuel to be injected into said each cylinder of said diesel engine; first sensor means for sensing an actual position of said fuel adjustment member and generating a signal indicative of the sensed actual position; second sensor means for sensing a lubricating oli temperature of said fuel injection pump and generating a signal indicative of the sensed temperature; third sensor means for sensing engine operating parameters; means for detecting an operating condition of said engine in accordance with the sensed engine operating parameters; fuel quantity control means for calculating a fuel quantity necessary for the detected engine operating condition and generate a signal indicative of a desired position of said fuel adjustment member corresponding to the calculated fuel quantity; servo control means responsive to said signal from said first sensor means, said signal from said fuel quantity control means and said signal from second sensor means for computing a control input value and producing an output signal so that the actual position of said fuel adjustment member sensed by said first sensor means is coincident with the desired position thereof indicated by said signal from said fuel quantity control means, said servo control means including minimum time control means deriving said control input value on the basis of a nonlinear dynamic model of said actuator and further in view of the sensed lubricating oil temperature.

BRIEF DESCRIPTION OF THE DRAWINGS

The object and features of the present invention will become more readily apparent from the following detailed description of the preferred embodiments taken in conjunction with the accompanying drawings in which:

FIG. 2 is a schematic block diagram showing the detail arrangement of the positioning servo system of FIG. 1;

FIG. 3 is a schematic block diagram illustrating the detail arrangement of the controlled system of FIG. 2;

FIG. 10 is a schematic block diagram illustrating the detail arrangement of the controlled system of FIG. 9;

FIG. 11 illustrates a circuit arrangement for performing a rate of minimum time control;

The same or corresponding elements and parts are designated at like reference numerals throughout the drawings.

DETAILED DESCRIPTION OF THE INVENTION

Figure 1:
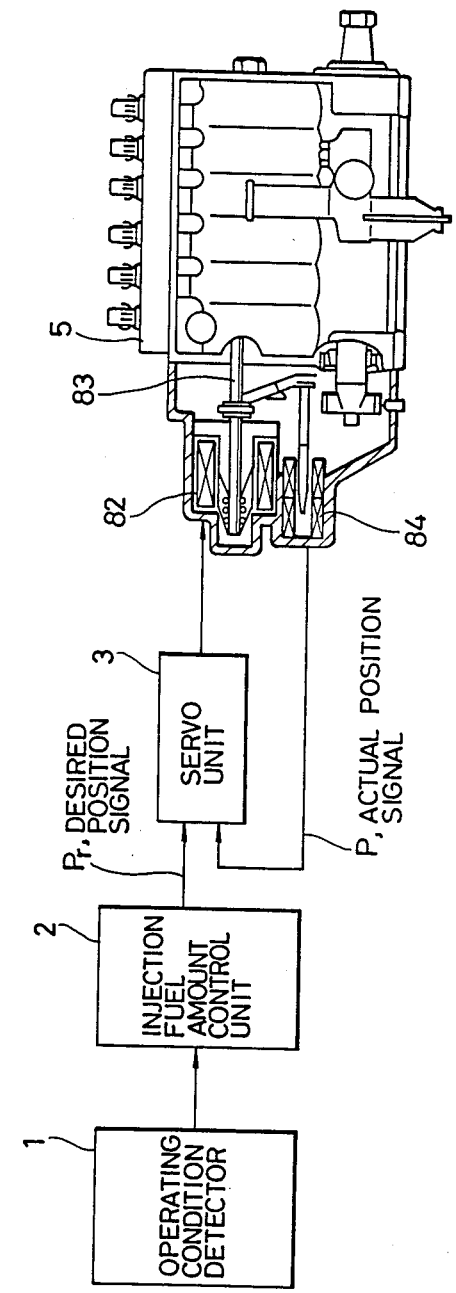
FIG. 1 is a schematic block diagram of an electronically controlled fuel injection system according to the present invention incorporated with a fuel injection pump of a diesel engine.

Referring now to FIG. 1, there is schematically illustrated an electronically controlled fuel injection system including a positioning servo unit according to the present invention incorporated with an in-line fuel injection pump 5 of a diesel engine having an actuator 82, a fuel adjustment member 83, such as a control rack, operatively responsive to the energization of the actuator 82, and a detector 84 for detecting an actual position of the fuel adjustment member.

The electronically controlled fuel injection system comprises a detector 1 for detecting engine operating conditions, an injection fuel amount control unit 2 including a well known microcomputer having a microprocessor or central processing unit (CPU), and a positioning servo unit 3 also including a well known microcomputer. The engine operating conditions are determined in accordance with engine operating parameters including engine coolant temperature, intake airflow amount, engine speed, throttle valve opening degree and so on which are measured by various engine condition sensors attached to the engine. The injection fuel amount control unit 2 derives a desired injection fuel amount from a map provided in a memory of the microcomputer as a function of the engine operating conditions detected by the detector 1 and produces a desired fuel adjustment member position signal indicative of the desired injection fuel amount. The positioning servo unit 3, in response to the desired position signal Pr produced by the control unit 2 and an output signal P of the detector 84 indicative of the present actual member position, controls the actuator 82 so that the actual position of the fuel adjustment member 83 coincides with the desired position thereof.

FIG. 2 is a schematic block diagram showing the detailed arrangement of the positioning servo system of FIG. 1.

The positioning servo system comprises a minimum time control unit 7, a controlled system 8, and a speed estimation unit 9. The minimum time control unit 7 is arranged to produce a control input signal U for the controlled system 8 in accordance with a signal indicative of a deviation $P_E$ between a desired position Pr of the fuel adjustment member 83 and an actual position P thereof, a current I passing through the actuator 82, and an estimated speed value of the fuel adjustment member 83 generated by the speed estimation unit 9. The control input signal U is a binary signal, as for example, ON-OFF control signal for an actuator-drive transistor.

The controlled system 8 is responsive to the control input signal U to generate a signal indicating the actual position of the fuel adjustment member 83 and a signal indicating a current value I passing through the actuator 82, both being control output signals thereof. The arrangement of the controlled system 8 is illustrated in detail in FIG. 3, which includes an actuator drive circuit 81, the actuator 82, fuel adjustment member 83 and actual position detector 84. The actuator drive circuit 81 comprises a switching element such as a power transistor, power FET or the like which controls a voltage to be applied to the actuator 82. In addition, the circuit 81 includes a resistor or the like, and thereby perform the detection of the current I passing through the actuator 82. As an example of the actuator 82, a linear solenoid actuator may be employed which changes the position of the fuel adjustment member 83 in response to the energization thereof. The actual position detector 84 is of variable inductance type which is well known in the art.

The speed estimation unit 9 is provided for estimating the speed of the fuel adjustment member 83. It is possible that the estimation speed value thereof is found not only by merely differentiating a signal P indicative of the actual position thereof, but also, if a noise is introduced on the actual position signal P, is calculated by means of a state observer arranged on the basis of the dynamic model of the controlled system 8.

The following is a description of the minimum time control employed in the servo system according to the present invention, the description will be made in accordance with "Instrumentation and Automatic Control Academy Editing, Automatic Control Handbook (Elementary Compilation)" issued on Oct. 30, 1983 by Omu Co., Ltd.

The items relating to the minimum time control are as follows:

controlled system: $\dot{x} = f(x, u)$ (1)

control input limitation: $u \in \Omega$ (2)

initial condition: $x(t_o) = x_o$ (3)

end condition: $x(t_f) = x_f$ (4)

evaluation function: $j = t_f + t_o$ (5)

where:
- f = nonlinear function
- x = n-dimension vector
- u = r-dimension control input vector
- Ω = closed area of r-demension space The minimum time control is started with the initial condition shown by the equation (3), and in accordance with the differential equation (1), the control input u (t) occurring orbit x(t), t∈[t₀, t_f], which satisfies the end condition expressed by the equation (4), is found so as to minimize the evaluation function J=t_f−t₀, provided that the control input u (t) is required to satisfy the equation (2).

The correspondence to the servo system according to the present invention is made as follows:

$$n=3, x=[P, V, I]^T, r=1, u=[U] \quad (6)$$

$$\dot{P}=V \quad (7-1)$$

$$\dot{V}=-(B/M).V+F(I, P)/M \quad (7-2)$$

$$F(I, P)=-kP+(a-bp)I \quad (7-3)$$

$$\dot{I}=-(R/L).I+E(U)/L \quad (7-4)$$

$$E(U) = \begin{cases} +12(U = ON) \\ -12(U = OFF) \end{cases} \quad (7-5)$$

where:
- B = coefficient of viscosity
- M = mass of movable section
- a, b = constant
- k = spring constant
- R = coil resistance
- L = coil inductance $$\Omega=[\text{actuator drive element ON, OFF}] \quad (8)$$

$$x_o=\text{option}, x_f=[Pr, 0, Ib]^T \quad (9)$$

where Ib represents a value required to normally satisfy P=Pr. To obtain u as a function of x represents the acquirement of a law, or rate, of minimum time control.

According to this servo system, the law of minimum time control is as follows:

$$U = \begin{cases} ON\{\text{in the case of } I < g(P - Pr, V)\} \\ OFF\{\text{in the case of } I \geq g(P - Pr, V)\} \end{cases} \quad (10)$$

where character g represents a function determined in accordance with the function f. The detailed description of the calculation method is omitted as stated in the above-mentioned literature.

In practice, it is difficult to obtain the speed value V of the equation (10), and therefore the speed value estimated by the speed estimation unit 9 will be used alternatively.

Figure 4:
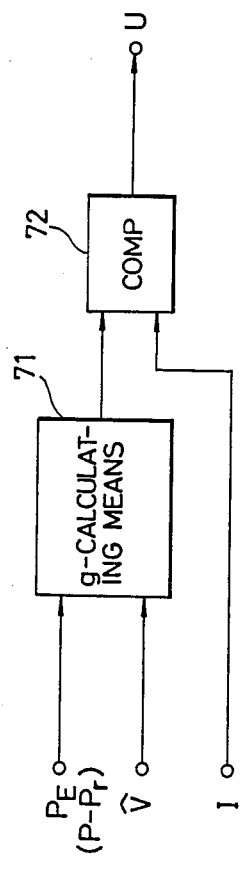
FIG. 4 illustrates a circuit arrangement for performing a rate of minimum time control.
Figure 5:
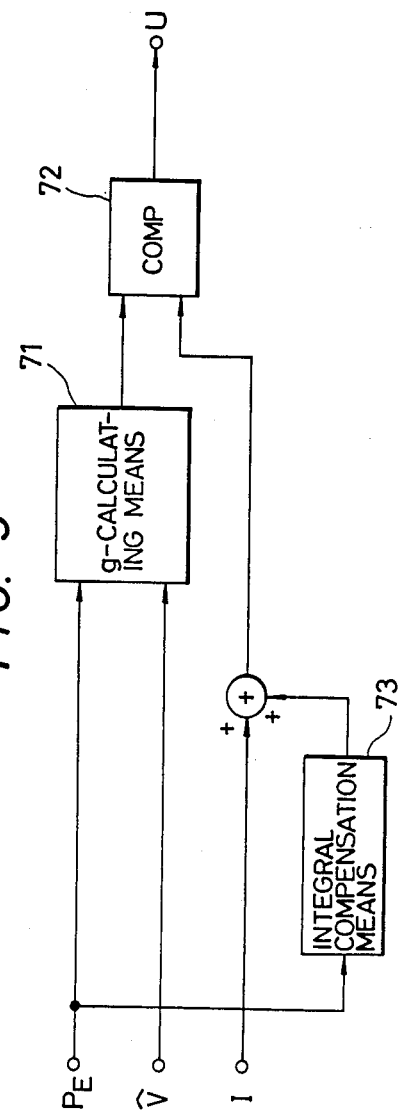
FIG. 5 shows a further circuit arrangement for effecting a rate of minimum time control
Figure 7:
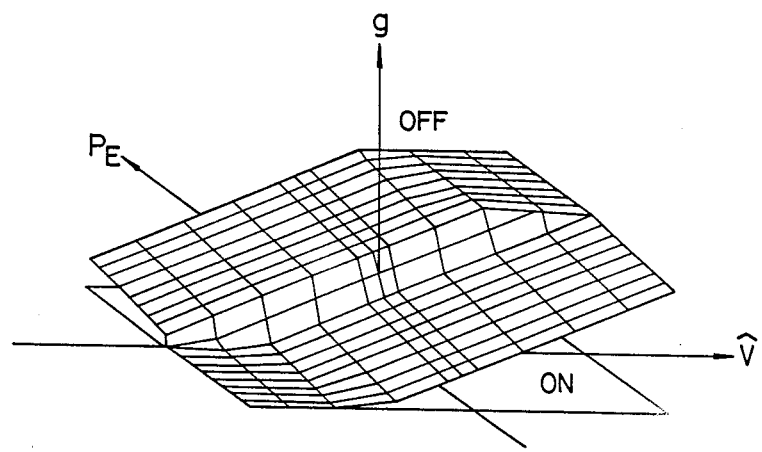
FIG. 7 illustrates a map for obtaining the g-function.

The equation (10) can be performed using a circuit shown in FIG. 4. The circuit comprises a g-calculating means 71 and a comparator 72. The g-calculating means 71 receives the deviation signal $P_E$, i.e. (P−Pr) and a signal indicative of the estimation speed value and calculates the function g, the result is fed to the comparator 72 and thereby compared with the current I passing through the actuator. In accordance with the results of the comparison, the actuator drive element is on-off controlled. Furthermore, as shown in FIG. 5, as a result of providing an integral compensation means 73 for adding the integral value of deviation $P_E$ to the current I, it is possible to prevent from the characteristic change of the function f caused by a secular change. The function g is derived from a map stored in a read only memory (ROM) as a function of P−Pr and / FIG. 7 illustrates an example of the map. This map is established on the basis of a nonlinear dynamic model of the actuator 82.

Figure 6:
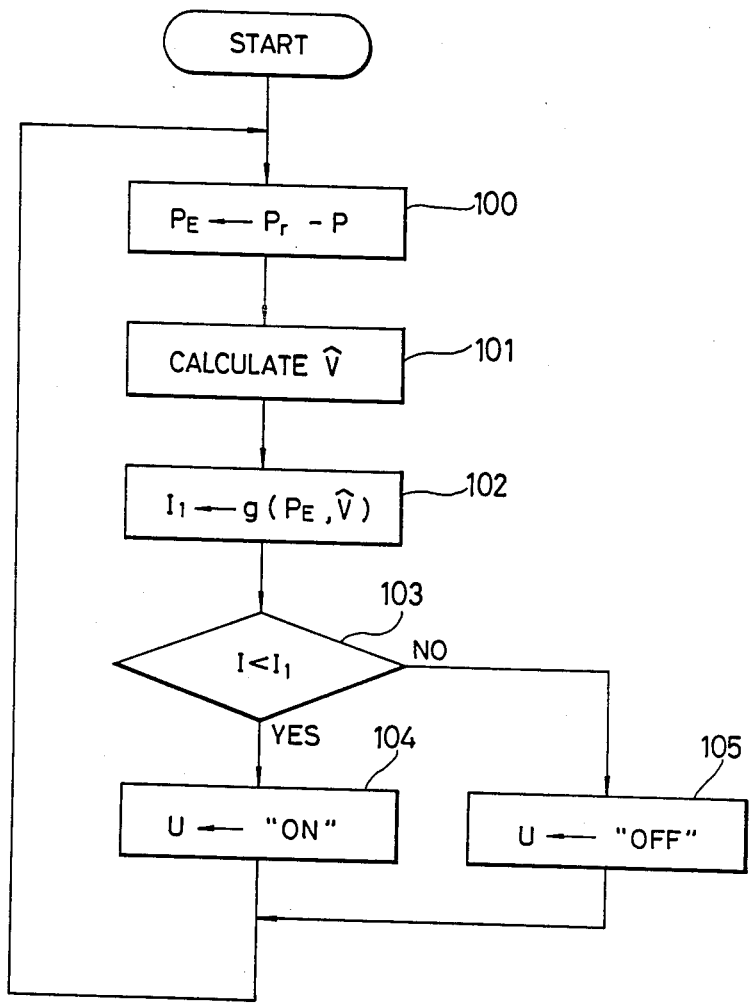
FIG. 6 is a flowchart describing the operation of the positioning servo control.

FIG. 6 is a flow chart describing the operation of the positioning servo system in the case that the integral compensation is not effected.

Initially, in a step 100, the CPU computes the deviation $P_E$ between a desired position Pr of the fuel adjustment member 83 and an actual position P thereof. A step 101 follows to calculate an estimation speed value by differentiating the actual position P or using a state observer generally employed for the purpose of the estimation of speed. The state observer substantially calculates the speed by differentiation of the actual position. A step 102 is then executed to calculate a function g ($P_E$, ) using, for example, the map as shown in FIG. 7 to thereby obtain a current value $I_1$. Thereafter, the CPU advances to a step 103 in which the current value $I_1$ obtained in the step 102 is compared with a current value I passing through the actuator 82. If $I<I_1$, a step 104 follows to set the control input U to the ON-condition, on the other hand, if not, a step 105 follows to set it to the OFF-condition. This routine is repeatedly executed so that the fuel adjustment member 83 is controlled to coincide with a desired position in a minimum time period.

Illustrated in FIGS. 8 to 13 is a further embodiment of the present invention similar to the embodiment shown in FIGS. 1 to 7 with the exception that it involves performing the minimum time control operation in accordance with engine operating parameters including a lubricating oil temperature of the fuel injection pump. Accordingly, parts corresponding to those of the first embodiment shown in FIGS. 1 to 7 are marked with the same reference numerals and characters, the description thereof are omitted for brevity.

Generally, the variations of the lubricating oil viscosity result in worsening the servo characteristics and further reducing the stability and responsibility of the servo system. Therefore, in order to eliminate these problems associated with the variations thereof, it is desirable to use the lubricating oil temperature as one of servo control parameters.

Figure 8:
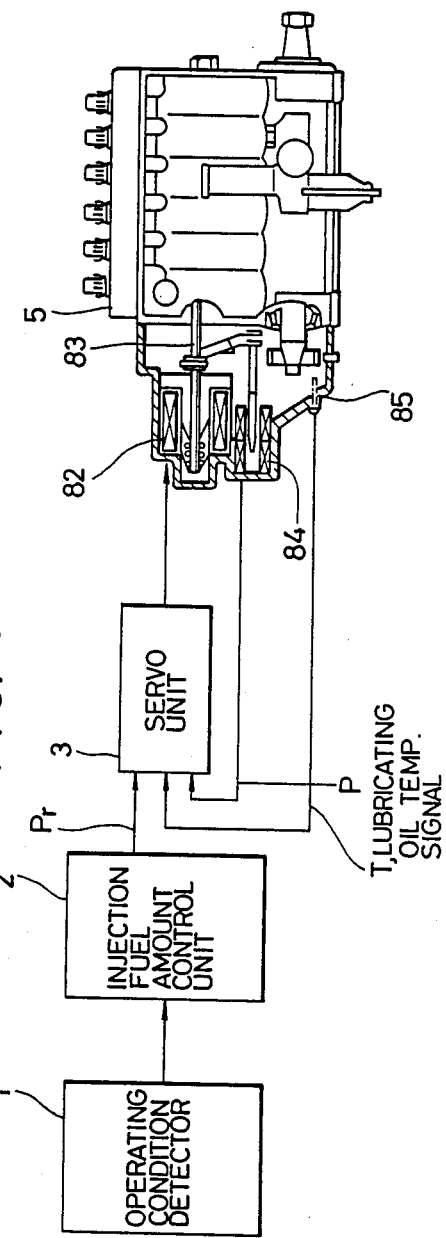
FIG. 8 is a schematic block diagram of an electronically controlled fuel injection system according to further embodiment of this invention also incorporated with a fuel injection pump of a diesel engine.
Figure 9:
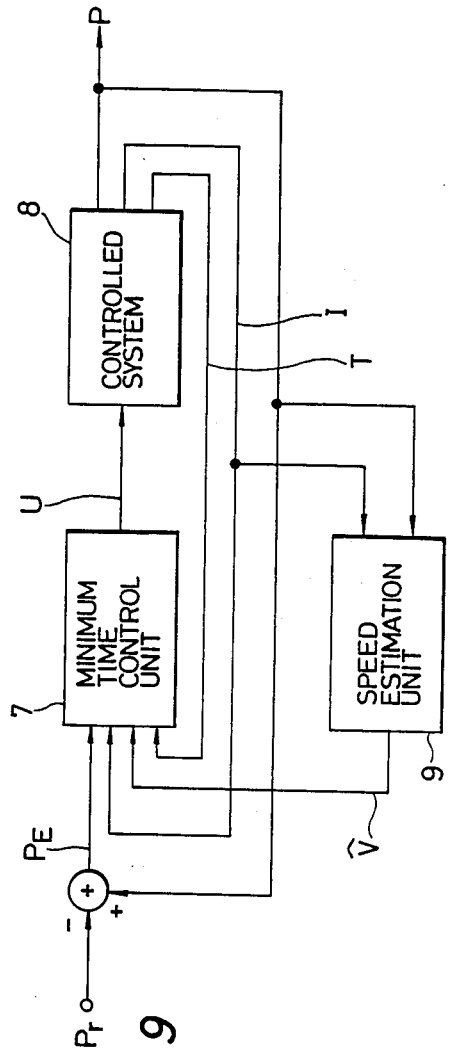
FIG. 9 is a schematic block diagram showing the detail arrangement of the positioning servo system of FIG. 8.

FIG. 8 is a schematic block diagram illustrating an electronically controlled fuel injection system according to the second embodiment of this invention. It is seen from FIG. 8 that a lubricating oil temperature detector 85 is further attached to the fuel injection pump 5 so that a signal indicative of a lubricating oil temperature T is supplied to the positioning servo unit 3. The lubricating oil temperature detector 85 comprises an element, such as a thermistor, capable of measuring temperatures of the lubricating oil in the pump 5. The detailed arrangement of the positioning servo unit 3 is illustrated in FIG. 9 which comprises the minimum time control unit 7, controlled system 8 and speed estimation unit 9. The controlled system 8, as described above, is responsive to a control input signal U from the minimum time control unit 7, to generate an actual position signal U, a actuator current signal I and further a lubricating oil temperature signal T which are used as parameters for the minimum time control operation. FIG. 10 illustrates the detail arrangement of the controlled system 8. As will be understood from FIG. 10, in response to a control input signal U, the actuator 82 is energized by the actuator drive circuit 81 and the energization of the actuator 82 causes the fuel adjustment member 83 to be controlled to approach to a desired position indicated by the control input signal U. The actual position detector 84 again detects the newly set position of the fuel adjustment member 83 to generate an actual position signal P. The lubricating oil temperature detector 85 detects a temperature of the oil lubricating the fuel adjustment member 83 and generates a signal T indicative of the detected oil temperature. An actuator current signal is supplied from the actuator drive circuit 81.

Resulting from using the lubricating oil temperature T with respect to the minimum time control operation, the controlled system is expressed by the following equation:

$$x = f(x, u; T)$$

and, because the g-function varies in accordance with the lubricating oil temperature T, the law of minimum time control is represented as follows:

$$U = \begin{cases} ON\{\text{in the case of } I < g(P - Pr, V, T,)\} \\ OFF\{\text{in the case of } I \geq g(P - Pr, V, T)\} \end{cases} \quad (11)$$

As well as the equation (10), since it is difficult to obtain the actual speed value V of the fuel adjustment member 83, the estimation value from the speed estimation unit 9 will be used alternatively.

Figure 13:
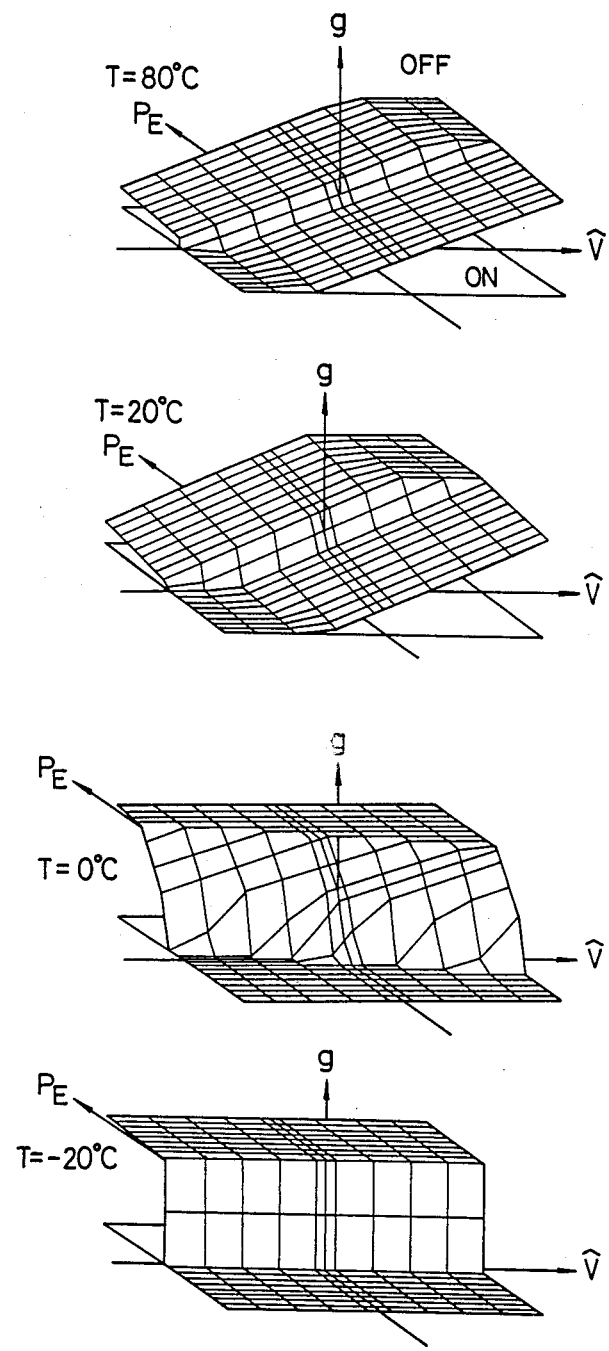
FIG. 13 illustrates maps for obtaining the g-function.

The equation (11) can be performed using a circuit as shown in FIG. 11. The function g is derived from a map stored in a read only memory (ROM) of the g-calculating means 71 as a function of (P−Pr), and T, and then compared with an actuator current I by the comparator 72 in order to effect the ON-OFF control of the actuator drive circuit 81. FIG. 13 shows various maps provided on the basis of a nonlinear dynamic model, one of them being selected in accordance with the lubricating oil temperature T. It is also appropriate to obtain using the tree-demention map interpolation.

Figure 12:
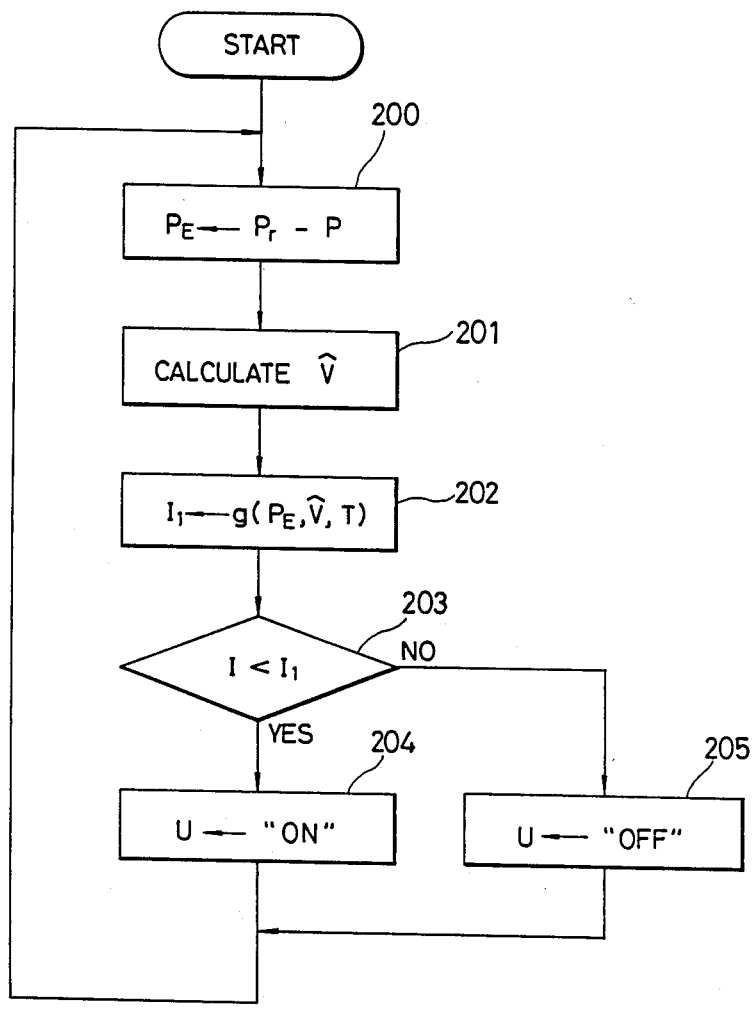
FIG. 12 is a flowchart describing the operation of the positioning servo control.

FIG. 12 is a flow chart describing the operation of the positioning servo system using the lubricating oil temperature T as a control parameter.

Initially, in a step 200, the CPU computes the deviation $P_E$ between a desired position Pr of the fuel adjustment member 83 and an actual position P thereof. A step 201 follows to calculate an estimation speed value by differentiating the actual position P or using a condition monitor. The condition monitor substantially calculates the speed by differentiation of the actual position. A step 202 is then executed to calculate a function g (PE, , T) using, for example, either of the maps as shown in FIG. 13 and thereby to obtain a current value $I_1$. Thereafter, the CPU advances to a step 203 in which the current value $I_1$ obtained in the step 102 is compared with a current value I passing through the actuator 82. If $I < I_1$, a step 204 follows to set the control input U to the ON-condition, on the other hand, if not, a step 205 follows to set it to the OFF-condition. The operational flow returns to the step 200 and this routine is repeatedly executed.

It should be understood that the foregoing relates to only preferred embodiments of the present invention, and that it is intended to cover all changes and modifications of the embodiments of this invention herein used for the purposes of the disclosure, which do not constitute departures from the spirit and scope of this invention. For example, although in the foregoing description the electronically controlled fuel injection system according to the present invention is employed for the in-line type injection pump, however it is also possible to apply to the distribution type injection pump.

What is claimed is:

1. A system for controlling a fuel quanity to be injected into each cylinder of a diesel engine by a fuel injection pump, comprising:
   an actuator coupled to said fuel injection pump;
   fuel adjustment means, operatively coupled to said fuel injection pump and responsive to an energization of said actuator, for adjusting a quanity of fuel to be injected into said cylinder of said diesel engine;
   actual position sensor means for sensing an actual position of said fuel adjustment means and generating a signal indicative of said actual position;
   second sensor means for sensing engine operating parameter and producing signals indicative thereof;
   means for detecting an operating condition of said engine in accordance with the sensed engine operating parameters;
   fuel quantity control means for calculating a fuel quantity necessary for the detected engine operating condition and for generating a signal indicative of a desired position of said fuel adjustment member corresponding to the calculated fuel quantity;
   servo control means responsive to said signal from said actual position sensor means and said signal from said fuel quantity control means for computing a control input value and for producing on ON-OFF control signal to said actuator on the basis of the computed control input value so that the actual position of said fuel adjustment means sensed by said actual position sensor means is coincident with the desired position thereof indicated by said signal from said fuel quantity control means, said servo control means including speed estimation means for estimating a speed of said fuel adjustment means by differentiating said signal from said actual position sensor means and minimum time control means for computing said control input value with a function that is obtained on the basis of a deviation between the actual position of said fuel adjustment means and the desired position thereof, and the estimated speed of said fuel adjustment means and with a current value corresponding to the obtained function being compared with a current passing through said actuator.

2. A system for controlling a fuel quantity to be injected into each cylinder of a diesel engine by a fuel injection pump, comprising:
   an actuator attached to said fuel injection pump;
   a fuel adjustment member operatively coupled to said fuel injection pump and responsive to an energization of said actuator for adjusting a quantity of fuel to be injected into said each cylinder of said diesel engine;
   first sensor means for sensing an actual position of said fuel adjustment member and generating a signal indicative of the sensed actual position;

second sensor means for sensing a lubricating oil temperature of said fuel injection pump and genenrating a signal indicative of the sensed temperture;

third sensor means for sensing engine operating parameters;

means for detecting an operating condition of said engine in accordance with the sensed engine operating parameters;

fuel quantity control means for calculating a fuel quantity necessary for the detected engine operating condition and for generating a signal indicative of a desired position of said fuel adjustment member corresponding to the calculated fuel quantity;

servo control means responsive to said signal from said first sensor means, said signal from said fuel quantity control means and said signal from said second sensor means for computing a control input value and producing an ON-OFF control signal to said actuator on the basis of the computed control input value so that the actual position of said fuel adjustment member sensed by said first sensor means is conincident with the desired position thereof indicated by said signal from said fuel quantity control means, said servo control means including speed estimation means for estimating a speed of said fuel adjustment member by differentiating said signal from said first sensor means and minimum time control means for computing said control input value with a function which is obtained based on the basis of a deviation between the actual position of said fuel adjustment member and the desired position thereof, the estimated speed of said fuel adjustment member and the sensed temperature and with a current value corresponding to the obtained function being compared with a current passing through said actuator.

3. A system as claimed in claim 1, wherein said servo control means includes a memory, and said minimum time control means derives said control input value from a map, said map being established on the basis of a nonlinear dynamic model of said actuator and being stored in the memory of said servo control means.

4. A system as claimed in claim 1, wherein said servo control means further includes an integral compensation means for calculate an integral value of said deviation and add the calculated integral value to said current passing through said actuator.

5. A system as claimed in claim 2, wherein said control input value is derived from one of plurality of maps established on the basis of said nonlinear dynamic model of said actuator at every lubricating oil temperature, said plurality of maps being stored in a memory of said servo control means addressible as a function of said current passing through said actuator, the deviation between the actual position of said fuel adjustment member and the desired position thereof, said lubricating oil temperature and said speed of said fuel adjustment member.

* * * * *